Nov. 14, 1950    T. F. WHICHARD, SR., ET AL    2,530,108
TRACTION DEVICE
Filed March 11, 1947
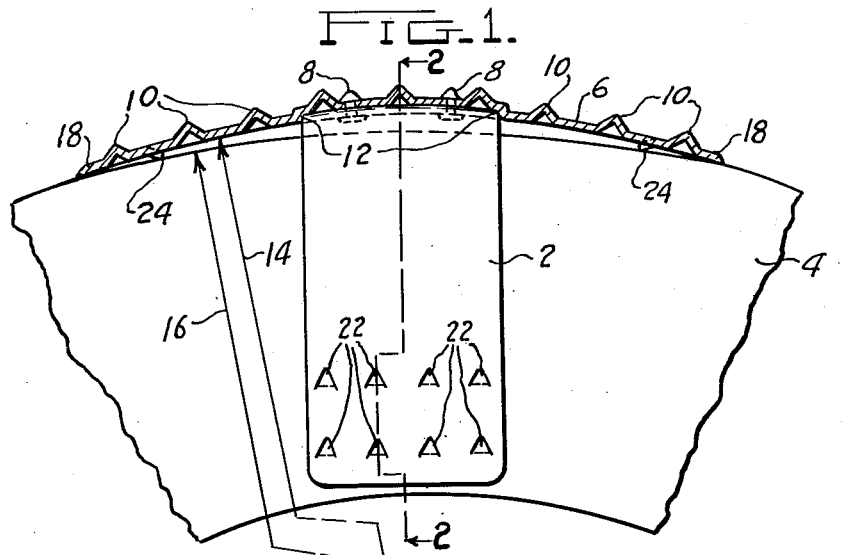
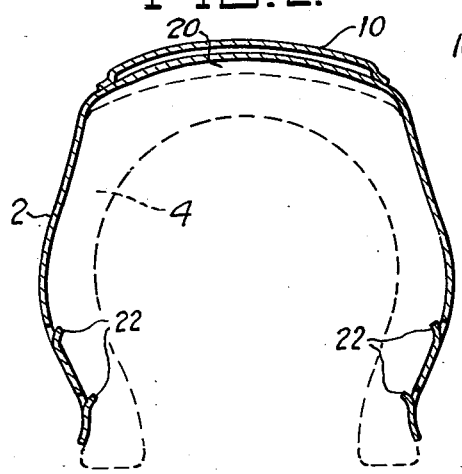
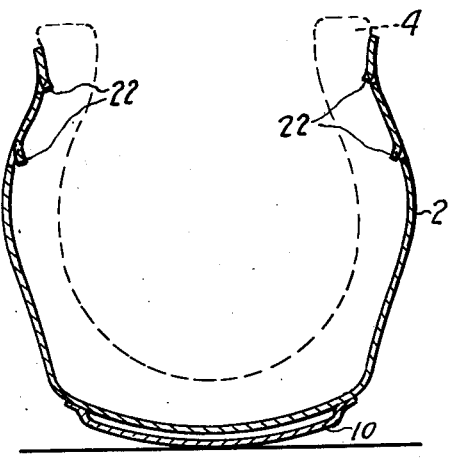
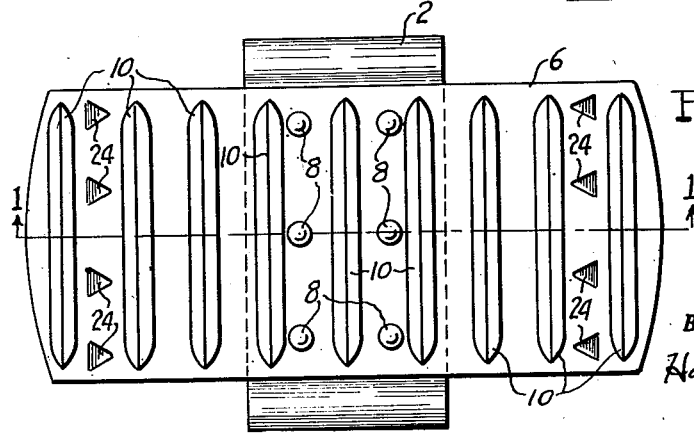
INVENTORS
Thomas F. Whichard Sr.
Carl E. Flodquist
BY Oscar B. Flodquist
Hauke & Hardesty
ATTORNEYS

UNITED STATES PATENT OFFICE 2,530,108

TRACTION DEVICE

Thomas F. Whichard, Sr., and Carl E. Flodquist, Detroit, and Oscar B. Flodquist, Pleasant Ridge, Mich., assignors to Whichard, Flodquist and Company, a partnership Application March 11, 1947, Serial No. 733,868

4 Claims. (Cl. 152—225)

This invention relates to a traction device which is easily applied to and removed from the drive wheel of an automotive vehicle.

Most drivers who are forced to drive in all kinds of weather have had the experience of getting their vehicle "stuck" in circumstances in which one or both drive wheels do not have the necessary traction to move the vehicle. An automotive vehicle may for example become stuck in a snowbank or in a mudhole, or it may happen to stop on an extremely slippery spot on an icy street and be unable to move off the slippery spot. In the case of mud and deep snow, those who have experienced such driving conditions can testify that the application of chains to the drive wheels under those circumstances presents a very great difficulty, if not an impossibility.

It is an object of this invention to provide a traction device for automotive vehicles which is easily applied to a drive wheel under such circumstances as make the use of chains extremely difficult, and which is easily and readily removed from the drive wheel upon the termination of the emergency circumstances requiring additional traction.

In the drawings:

Fig. 1 is a side elevation view showing a portion of a pneumatic tire and showing a traction device made according to the invention held in place on the tire. In Fig. 1, a portion of the traction device is shown in section. This portion is the shoe and the section is substantially on the line 1—1 of Fig. 4.

Fig. 2 is a view in section substantially on line 2—2 of Fig. 1.

Fig. 3 is a view similar to Fig. 2, but showing the traction device in engagement with the ground, and Fig. 4 is a plan view of the ground-engaging face of the traction device.

A traction device according to the invention comprises a holder member 2 in the form of a U-shaped spring, the arms of which are adapted to engage the sidewalls of a tire 4. The holder is made of spring stock and the arms of the U are spring biased inward in order to insure close contact with the tire sidewalls.

A tire shoe 6 is secured to the holder member 2 by any suitable means such as by rivets 8. A plurality of ground-engaging cleats 10 are provided on the outer or ground-engaging surface of the shoe 6. Cleats 10 are elongated indentations which are formed in the inner or tire engaging face of shoe 6. The metal or other material of the shoe 6 is deformed substantially radially outwardly to form the raised projections or cleats shown in the drawings. The cleats preferably extend substantially across the width of the shoe 6.

As is best seen in Fig. 1, shoe 6 is offset radially near its middle at the two points 12. The amount of this offset depends upon the thickness of the holder member 2, and is such that the inner or tire engaging face of tire shoe 6 forms with the inner face of holder member 2 what is substantially an unbroken surface.

The radius of shoe 6 is preferably somewhat shorter than the outside radius of tire 4. This is best seen in Fig. 1, in which the shoe radius is shown by broken line 14 and the tire radius by broken line 16. Lines 14 and 16 representing their respective radii are shown broken in order to foreshorten them to keep them on the paper.

The radius of the shoe 6 in the plane of the wheel, as seen in Fig. 1, may be termed the "free" radius of the shoe, meaning the radius which the shoe assumes so long as it is free from the distorting effect of applied forces. Under these circumstances, shoe 6 is in contact with the tread or ground-engaging surface of tire 4 substantially only at its ends 18, and their is a substantial gap or space 20 between the shoe and the tire at a point midway between the ends 18. It will of course be understood that the load of the automotive vehicle on the shoe when the shoe is in engagement with the ground will deflect the ends of the shoe, and to some extent the tire itself, to bring the shoe and tire into engagement substantially throughout the circumferential extent of the shoe. Thus the gap between the shoe and the tire will disappear when the vehicle weight is on the shoe. This is the situation shown in Fig. 3.

The holder member 2 is provided with inwardly extended tire engaging projections 22. These projections are formed from V-shaped slits in the material of the holder member, the point of vertex of the V being displaced out of the plane of the holder material as shown in Figs. 2 and 3 to form the desired projections. Similar projections 24 are provided near the ends 18 in the shoe 6, to hold the shoe against circumferential displacement along the tire.

*Operation*

The operator of an automotive vehicle will normally carry one traction device made according to this invention for each drive wheel of his vehicle. When the vehicle is immobilized for lack of sufficient traction because of snow, ice, mud, or the like, the driver slips a traction device over the tire of each drive wheel simply by springing the arms of the spring clamp 2 apart slightly to put the traction device in place. Then he drives the vehicle out of the difficult snowbank, mudhole, or off the icy spot, and removes the traction device.

A traction device made according to this invention is one that is used with a minimum of difficulty, and is effective to accomplish the intended purpose.

We claim:

1. In a traction device for a rubber tired vehicle wheel, a spring biased U-shaped holder member encompassing the tread and both side walls of the tire and yieldingly engaging the tire side walls when normally assembled therewith, a flexible arcuate tire shoe secured to said holder member and having a free radius in the plane of the wheel which is less than the outside radius of the tire to which it is adapted to be applied, the said tire shoe end portions extended about the periphery of the tire to either side of the holder member, said tire shoe being flexed under load to engage the outer periphery of the tire throughout its length, said holder member having inwardly projecting tongues engaging the tire side walls, and said tire shoe having a plurality of radially outwardly projecting ground cleats.

2. In a traction device for a rubber tired vehicle wheel as set forth in claim 1 in which the holder member consists of a single spring member adapted to straddle the tire and secured at the midpoint to the under surface of said tire shoe.

3. In a traction device for a rubber tired vehicle wheel as set forth in claim 1 in which the tire shoe is distorted under load to lengthen the radius of the curvature of the inner face thereof to match the outside radius of the tire.

4. In a traction device for a rubber tired vehicle wheel as set forth in claim 2 in which the midsection of the tire shoe is radially outwardly offset to provide a recess to receive the holder member and align the inner face of the holder flush with the inner face of the tire shoe.

THOMAS F. WHICHARD, Sr.
CARL E. FLODQUIST.
OSCAR B. FLODQUIST.

REFERENCES CITED

The following references are of record in the file of this patent:

UNITED STATES PATENTS

| Number | Name | Date |
|---|---|---|
| 559,958 | Terry | May 12, 1896 |
| 928,433 | Evans | July 20, 1909 |
| 1,226,358 | Nace | May 15, 1917 |
| 1,285,406 | Sangoff | Nov. 19, 1918 |
| 1,297,869 | Kosht | Mar. 18, 1919 |
| 1,329,200 | Newhope | Jan. 27, 1920 |
| 1,438,148 | Vescovi | Dec. 5, 1922 |
| 1,609,464 | Compton | Dec. 7, 1926 |
| 1,619,170 | Vosburgh | Mar. 1, 1927 |

FOREIGN PATENTS

| Number | Country | Date |
|---|---|---|
| 571,761 | Germany | Feb. 16, 1933 |
| 798,045 | France | May 8, 1936 |